Oct. 28, 1958  T. M. COSTAKOS  2,858,052
CREAM DISPENSER
Filed Dec. 29, 1954  2 Sheets-Sheet 1
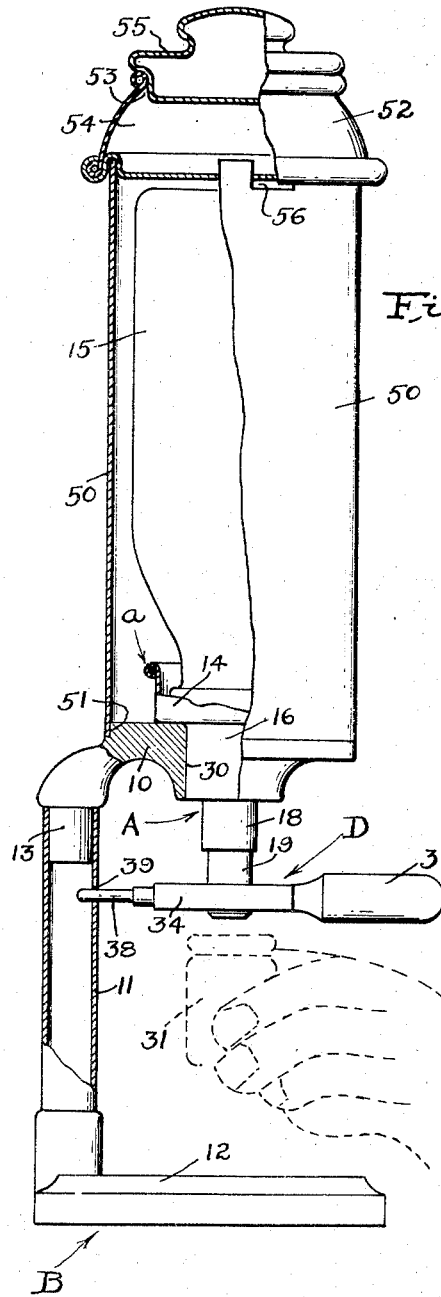
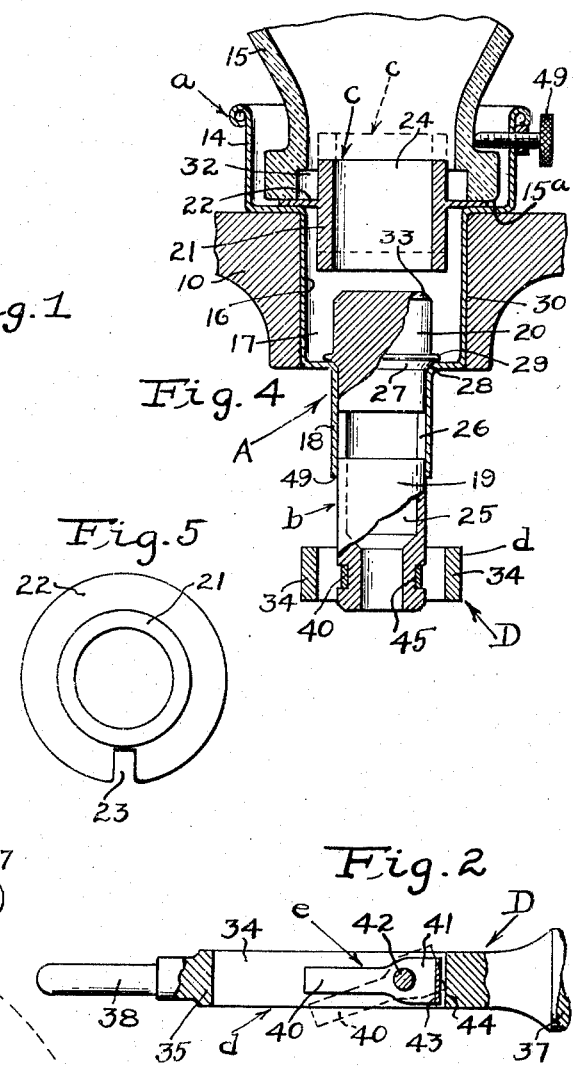
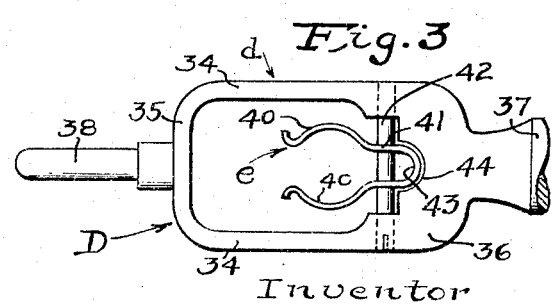
Inventor
Theodore M. Costakos
By Caswell + Lagaard
Attorneys Oct. 28, 1958 T. M. COSTAKOS 2,858,052
CREAM DISPENSER
Filed Dec. 29, 1954 2 Sheets-Sheet 2

Inventor
Theodore M. Costakos
By Caswell + Lagaard
Attorneys

United States Patent Office 2,858,052
Patented Oct. 28, 1958

2,858,052

CREAM DISPENSER

Theodore M. Costakos, Minneapolis, Minn.

Application December 29, 1954, Serial No. 478,384

4 Claims. (Cl. 222—185)

My invention relates to improvements in dispensers and particularly dispensers for delivering cream in selectively variable measured amounts, the same being of the nature disclosed in Patents Nos. 2,457,531 and 2,519,115, issued to me December 28, 1948 and August 15, 1950, respectively.

In each of said previously patented dispensers, the liquid is dispensed from a container incorporated in the structure and filled from time to time by the user to provide the supply of liquid to be dispensed. The present construction eliminates any such built-in container for the supply of cream and, in place thereof, accommodates the conventional cream-filled bottle employing the same as the source of supply from which cream is dispensed.

An object of the present invention is to provide an improved and sanitary dispenser, as aforesaid, which is of exceedingly simple, durable and inexpensive construction consisting of relatively few parts adapted to be quickly and easily assembled for use and disassembled for the ready and thorough cleansing of the parts thereof.

A further object of the invention is to provide a dispenser, as above indicated, in which the simple reversal of one of its parts in the assembly establishes a change of adjustment of the dispensing mechanism resulting in the delivery of a charge of cream in predetermined quantity peculiar in amount to the particular adjustment attained.

Another object of the invention is to provide a dispenser, as aforesaid, adapted to provide for the ready application thereto of a bottle containing cream and disposed in inverted position.

Other objects of the invention reside in the novel combination and arrangement of parts and in the details of construction hereinafter illustrated and/or described.

In the drawings:

Fig. 1 is a side elevational view of a cream dispenser constructed in accordance with the present invention, portions thereof being broken away to reveal otherwise concealed portions of the valve mechanism.

Fig. 2 is a fragmentary elevational view, partly in section, illustrating the actuating lever for the lift valve of said valve mechanism.

Fig. 3 is a plan view of the structure shown in Fig. 2.

Fig. 4 is a vertical sectional view in detail of said valve mechanism, said view being taken in a plane transversely of said lever.

Fig. 5 is a plan view in detail of the reversible valve sleeve of said valve mechanism.

Figure 6:
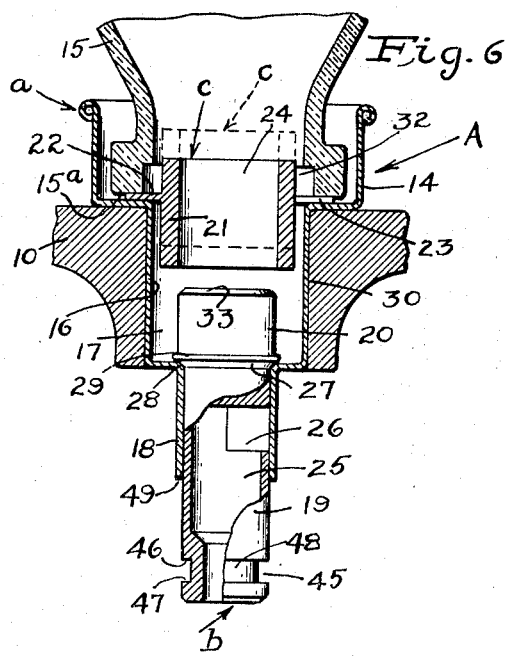
Fig. 6 is a vertical sectional view in detail of said valve mechanism, the same being taken in a plane at right angles to the plane of the similar view shown in Fig. 4.
Figure 7:
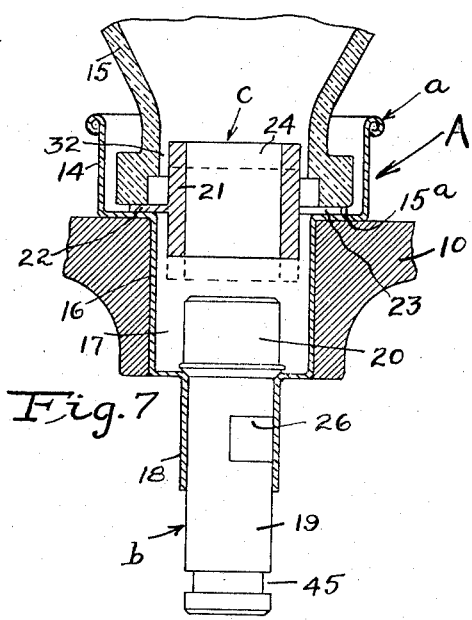
Figure 8:
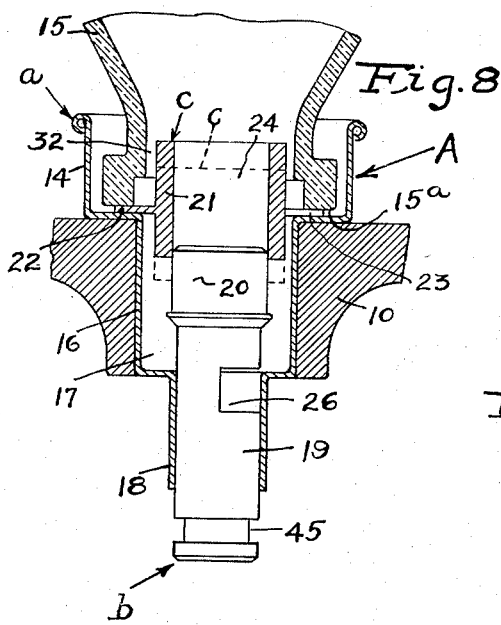
Figure 9:
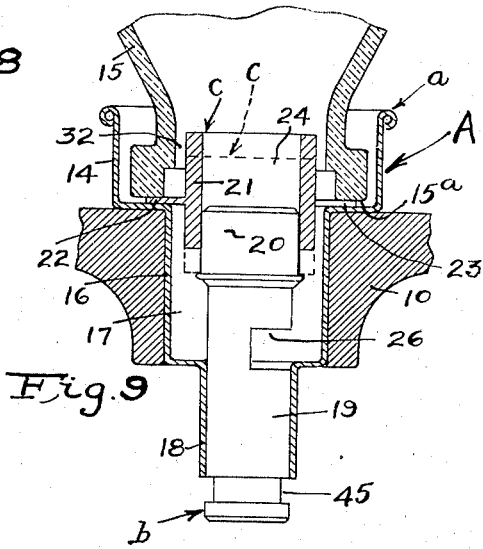

Figs. 7, 8 and 9 are diagrammatical views patterned after and illustrating the elements shown in Fig. 6, the valve sleeve in said diagrammatical views being endwise reversed as compared with the disposition thereof shown in Fig. 6, the lift valve in the diagrammatical views 8 and 9 being relatively differently disposed and disposed differently than is shown in Fig. 6.

The illustrated embodiment of my invention includes a valve mechanism designated in its entirety by the reference character A. A supporting structure B for said valve mechanism A consists of a bed member 10 carried by a tubular post 11 upstanding from a base member 12, said bed member 10 being provided with an offset depending boss 13 socketed in the upper end of said post 11.

The valve mechanism A includes a cupped receiver 14 for the reception of the open end of an inverted cream bottle, as at 15, also a sump member 16 providing a sump chamber 17 for said receiver 14, and a tubular valve guide 18 opening into said chamber 17 and extending downwardly from said sump member 16. Said receiver 14, sump member 16 and valve guide 18 are spun from sheet metal or otherwise suitably formed to provide a unitary valve casing $a$ in which said receiver 14, sump member 16 and valve guide 18 are all of annular formation having a common axis. Said valve mechanism A further includes a lift valve $b$ and a valve sleeve $c$. Said lift valve $b$ consists of a stem 19 and head 20 thereon, said stem 19 being adapted to be slidably received in the valve guide 18 of the valve casing $a$ with said head 20 of said valve disposed within the chamber 17 of the sump member 16. The valve sleeve $c$ includes a tubular body 21 having thereon an annular flange 22 which is located between the ends of said body 21 nearer to one end thereof than the other, said flange being formed with a notch 23 therein. This annular flange 22 is adapted to be seated on the bottom of the receiver 14 of the valve casing $a$ and when so positioned it supports the tubular body 21 of the valve sleeve $c$ in axial coincidence with the lift valve $b$ with one end portion of said tubular body 21 disposed within the sump chamber 17. Said valve sleeve $c$ is endwise reversible in its application to the valve casing 14 so that the relatively long end portion of said tubular body 21 or the relatively short end portion thereof may be located within the sump chamber 17 as elected. The tubular body 21 of said valve sleeve $c$ provides a duct 24 for purposes hereinafter explained, said duct 24 being adapted to receive the head 20 of the lift valve $b$ and to be obstructed thereby upon the lifting of said valve $b$.

The stem 19 of the lift valve $b$ has an axial bore 25 therein which is open at the bottom of the stem, and said stem 19 has a port 26 in the side thereof which leads into said discharge bore 25. At the base of the head 20 of the lift valve $b$ is a beveled annular shoulder 27 which, upon the lowering of the lift valve, engages the valve seat 28 formed at the junction of the valve guide 18 and sump member 16. This beveled shoulder 27 serves as a low-limit stop for the lift valve $b$ and seals off the sump chamber 17 from the valve guide 18 in the depressed position of said valve $b$. On the valve head 20, adjacent said beveled shoulder 27, is an annular stop-bead 29 which is adapted to engage the tubular body 21 of the valve sleeve $c$ and limit the movement of the valve head 20 thereinto, this being for a purpose hereinafter to appear.

The bed member 10 of the supporting structure B has a vertical bore 30 therein centrally thereof for the removable reception of the sump member 16 of the valve case $a$, said sump member 16 being socketed in said bore 30 with the bottom of the receiver 14 resting on the bed member 10 and the valve guide 18 of said valve case $a$ depending from said bed member when said valve case is mounted on said bed member 10.

To prepare the dispenser for the delivery from a cream-filled bottle of a charge of cream in measured quantity upon the elevation of the lift valve $b$ at each cycling thereof, the valve mechanism A is removed temporarily from the bed member 10 of the supporting structure A and applied in inverted position to the upright bottle. In this preparatory operation, the open end of the bottle, such as the bottle 15, is freely received by the receiver 14 of the valve case *a*. The flange 22 of the valve sleeve *c* is rested upon the lip 15ᵃ of the upright bottle 15 and the end portion of the valve-sleeve body 21, not then disposed within the sump chamber 17, is freely received within the mouth of the bottle. In such inverted position of the valve mechanism A, the lift valve *b*, unless held back, would tend to fall from the valve guide 18 and pass through the valve-sleeve body 21 into the bottle. Such accidental displacement of the lift valve *b* is prevented, however, by engagement of the stop-bead 29 on the valve head 20 with the end of the valve-sleeve body 21 located within the sump chamber 17. After simultaneously inverting the upright bottle 15 and the inverted valve mechanism A applied thereto, the latter, then upright, is remounted on the bed member 10. The lip 15ᵃ of the then inverted bottle 15 rests on the flange 22 of the valve sleeve *c* which in turn rests on the bottom of the receiver 14, and the lift valve *b* occupies its normal depressed position wherein the port 26 therein is closed by the valve guide 18 and said guide is sealed off from the sump chamber 17 by the beveled shoulder 27 on said lift valve *b*.

In either selected endwise disposition of the valve sleeve *c* in the valve casing *a*, the notch 23 in the flange 22 of said valve sleeve provides a passageway establishing communication between the open receiver 14 and the interior of the bottle 15, and also between said receiver 14 and the interior of the sump chamber 17.

Having inverted the upright cream-filled bottle 15 and the inverted valve mechanism A superimposed thereupon and having mounted the same on the bed member 10, cream will have passed from the bottle 15 through the tubular body 21 of the valve sleeve *c* into the sump chamber 17, filling said chamber. At such time the notch 23 in the valve-sleeve flange 22 provides a passageway between the sump chamber 17 and receiver 14 for escape to the atmosphere of cream-displaced air in said sump chamber 17. Additionally said notch 23 in said valve-sleeve flange 22 provides a passageway between the interior of the bottle 15 and said receiver through which passageway cream is enabled to flow into the receiver 14 in sufficient amount to seal the inverted bottle 15 about the lip 15ᵃ thereof. In such situation, as is well known, the column of cream remaining in the bottle 15 will be sustained in equilibrium by atmospheric pressure.

To deliver from the sump chamber 17 the charge of cream contained therein, the lift valve *b* is elevated to open its port 26 into said sump chamber, as shown in Fig. 9, allowing the contents of said chamber 17 to drain therefrom, through the discharge bore 25 in the valve stem 19, into a cream pitcher, as at 31 (Fig. 1), or other receptacle. As the lift valve *b* is elevated to dispense the contents of the sump chamber 17, the valve head 20 enters the duct 24 in the valve-sleeve body 21 prior to the opening of the valve-stem port 26 into said chamber 17, as will be readily comprehended from Fig. 8 of the drawing. Entering the duct 24 in the valve-sleeve body 21, the head 20 of the lift valve *b* obstructs said duct 24 preventing any cream from flowing therethrough from the bottle 15 to the sump chamber 17 while said chamber is open for the delivery of cream therefrom through the stem 19 of the elevated lift valve *b*. Thus, it will be understood that upon lifting the lift valve *b* a charge of cream will be dispensed from the device in amount substantially equaling the then obtaining capacity of the sump chamber 17, such amount being determined by the elected endwise dispositioning of the valve sleeve *c* in the valve casing *a*.

In the dispensing operation just mentioned, the drainage of cream from the sump chamber 17 is facilitated by the entry of air into said chamber 17 from the receiver 14 through the notch 23 in the valve-sleeve flange 22, the seal formed about the lip 15ᵃ of the bottle by cream contained in the receiver 14 being briefly broken at such time and then promptly restored upon the escape of the charge of the cream from said sump chamber 17.

Having dispensed the contents of the sump chamber 17, the lift valve *b*, upon being lowered, will clear the duct 24 in the valve-sleeve body *b* allowing cream to descend from the bottle through said duct and again fill said sump chamber 17. In such refilling of the sump chamber 17, retained air in said chamber 17 and air supplied thereto from the outside by way of the notch 23 in the valve-sleeve flange 22 is admitted through the valve-sleeve duct 24 into the bottle 15 to replace the charge of cream descending into said sump chamber 17. Some of such cream-replacing air may, at times, be supplied to the interior of the bottle 15 from the receiver 14 through the notch 23 in the valve-sleeve flange 22 and through the space 32 between the bottle 15 and that portion of the valve-sleeve body 21 within the mouth of said bottle.

The upper end of the head 20 of the lift valve *b* is annularly beveled, as at 33, so that if the valve sleeve *c* is not precisely centered in the valve case *a*, coaxially with said lift valve, said valve head 20 will, upon engagement with the lowermost end of the valve-sleeve body 21, cause said body 21 to be so centered for entry of the valve head 20 into the duct 24 therein.

Valve lifting means provided for the lift valve *b* consists of an actuating lever D having a coupler *e* thereon for detachably connecting said lever to said lift valve. The lever D has an intermediate frame-like member *d* including relatively spaced side rails 34, a front cross bar 35 and a rear cross bar 36. Extending rearwardly from the rear cross bar 36 is a handle 37. Extending forwardly from said front cross bar 35 is a fulcrum pintle 38 which is adapted to be removably inserted into an opening 39 in the tubular post 11 of the supporting structure B and to fulcrum against the wall of said opening. Said coupler *e* is of yoke-like formation and made of spring steel or other suitable resilient material. This coupler *e* has forwardly extending arms 40 and a shank 41 in the form of a loop connecting said arms, one to the other. A pivot pin 42 carried at its ends by the side rails 34 of the lever D extends through the shank 41 of the coupler *e* and rockably mounts said coupler on said lever D. The extent of the tilting of the rockable coupler *e* relative to the lever D is limited as shown in Fig. 2, wherein it may be seen that the end 43 of the crank 41 will engage the forward wall 44 of the rear cross bar 36 of the lever D upon comparatively slight tilting movement of the coupler *e* biasing the same in either direction relative to the plane of the intermediate *d* of the lever D. In said intermediate member *d* of the lever D, the space between the front bar 35 and the forward ends of the arms 40 of the coupler *e* is greater than the diameter of the stem 19 of the lift valve *b* and likewise greater than the diameter of said stem is the space between the side rails 34 of said lever D. Thus, the intermediate member *d* of the lever D may be brought into position encompassing the lower end portion of the valve stem 19 with the coupler *e* located to the rear of said stem. An annular groove 45 formed in said lower portion of the valve stem 19 is adapted at opposite sides thereof to receive the arms 40 of the coupler *e*. Said coupler-arms 40 corresponds in width to the distance between the upper and lower radial walls 46, 47 of said groove 45 so that the upper and lower edges of said arms 40 will snugly engage said radial walls 46, 47, respectively. The coupler arms 40 are arcuately shaped for conformity with the circumferential wall 48 of the groove 45 in the valve stem 19. With the actuating lever D and coupler *e* constructed, as aforesaid, the fulcrum pintle 38 of the lever may be inserted into the opening 39 in the post 11 and the lever manipulated to direct the yielding arms 40 of the coupler *e* into the groove 45 in the valve stem 19, thereby coupling the lever D to said valve stem. This accomplished, upward pressure on the handle 37 of the lever D will effect the lifting of the lift valve *b*, while the releasing of said handle will result in the gravitational descent of said lift valve b. It has been seen that the beveled shoulder 27 on the lift-valve b engages the bottom of the sump member 16 and limits the descent of said valve b. An upper limit stop for said lift valve b is provided by the coupler e, the arms 40 of which engage the lower edge 49 of the valve guide 18 and arrest the ascent of said valve b. Reversal of the operation employed in fulcruming the lever D on the post 11 and connecting it with the lift valve b results in disconnecting the lever D from said lift valve b and in removal of said lever from the supporting structure B.

Employing the groove 45 in the valve stem 19 in providing the detachable connection between said valve stem and the lever D enables the lift valve b to be readily disassembled from its companion parts of the valve mechanism A so that it, like the disassembled valve sleeve c and valve casing a may be thoroughly cleansed separately.

If desired, a number of binding screws, as at 49, may be applied to the wall of the receiver 14 for engagement with the neck of a bottle to prevent the accidental tipping thereof in said receiver.

Preferably, a cylindrical housing 50 for the bottle 15 will be removably seated on the bed member 10 of the device, as in a rabbet 51 formed circumferentially of said bed member for the reception of the lower end of such housing. To close the upper end of the housing 50, a removable compartmented cap 52 is furnished, said cap having a filler opening 53 therein for the introduction of ice into the compartment 54 thereof, it being desirous in some situations to thus supply a cooling medium for the preservation of the cream in the bottle 15. The filler opening 53 in the cap 52 is provided with a removable closure 55. To insure access of outer air to the receiver 14 of the valve mechanism A, the housing 50 is provided with one or more apertures, as at 56.

Changes in the specific form of the invention, as herein described, may be made within the scope of what is claimed without departing from the spirit of the invention.

Having described the invention, what is claimed as new and desired to be protected by Letters Patent is:

1. In a cream dispenser, valve mechanism, supporting means therefor, said valve mechanism being adapted to dispense successive charges of cream in measured quantities from an inverted cream-containing bottle, said mechanism including a cupped receiver freely receiving the open end of an inverted bottle applied thereto, a sump member for said receiver providing a sump chamber for measuring charges of cream, a tubular guide opening into and extending downwardly from said sump member, a lift valve movable from a depressed position to an elevated position and back, said lift valve having a stem and a head thereon, the stem being slidably received within said tubular guide with said valve head disposed within said sump chamber, said stem being formed with a longitudinal discharge bore open at its lower end and with an ingress port in the side thereof leading into said bore, said tubular guide serving to close the ingress port in the valve stem in depressed disposition of the lift valve, a valve sleeve having an annular flange thereon resting on the bottom of the receiver and removably holding said sleeve suspended within said sump chamber, said flange supplying a footing within said receiver for the lip of the inverted bottle, said flange being provided with passageway-forming means bringing the interior of the bottle, the interior of the receiver externally of the bottle, and the sump chamber into communication with each other, said valve sleeve providing a duct bringing the interior of the bottle into communication with said sump chamber, the head of the lift valve being adapted to enter and move along said duct obstructing the same upon the lifting of said valve, the ingress port in the stem of the valve being adapted to clear the valve guide upon the lifting of the valve and to open into the sump chamber following the obstruction of said duct in the valve sleeve by the head of the valve, and means for lifting the valve.

2. A cream dispenser, as defined in claim 1, wherein the flange on the valve sleeve is located between the ends thereof and nearer to one end than the other, said sleeve being reversible end-for-end from one disposition thereof to another, the end of the sleeve disposed above the flange being freely received within the mouth of the bottle, said sleeve occupying more space within the cream-measuring sump chamber in one disposition thereof than the other, thereby providing for the supply of charges of cream from the valve mechanism in selectively varying quantities.

3. A cream dispenser, as defined in claim 1, wherein the flange on the valve sleeve is formed with a notch therein providing the said passageway-forming means therefor.

4. A cream dispenser, as defined in claim 1, wherein the receiver, sump member and tubular valve guide constitute a unitary valve case removable from the supporting means for the valve mechanism, said case, valve sleeve and lift valve being adapted to be initially applied in inverted position of the valve mechanism to a bottle uprightly disposed.

References Cited in the file of this patent

UNITED STATES PATENTS

| | | |
|---|---|---|
| 2,343,847 | Swann | Mar. 7, 1944 |
| 2,466,899 | Kincaid | Apr. 12, 1949 |
| 2,603,397 | Olson | July 15, 1952 |

FOREIGN PATENTS

| | | |
|---|---|---|
| 567,957 | Great Britain | Mar. 9, 1945 |